(12) United States Patent
Thadishetty et al.

(10) Patent No.: US 10,079,812 B1
(45) Date of Patent: Sep. 18, 2018

(54) SECURE CONTENT STORAGE BY CUSTOMER-PREMISES EQUIPMENT

(71) Applicant: Juniper Networks Inc., Sunnyvale, CA (US)

(72) Inventors: Venkanna Thadishetty, Bangalore (IN); Ravindranath C. Kanakarajan, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 206 days.

(21) Appl. No.: 15/078,908

(22) Filed: Mar. 23, 2016

(51) Int. Cl.
| | |
|---|---|
| *H04L 29/06* | (2006.01) |
| *H04L 29/08* | (2006.01) |
| *G06F 21/60* | (2013.01) |
| *H04L 9/32* | (2006.01) |
| *H04L 9/08* | (2006.01) |

(52) U.S. Cl.
CPC ........ *H04L 63/0471* (2013.01); *G06F 21/602* (2013.01); *H04L 9/0827* (2013.01); *H04L 9/3234* (2013.01); *H04L 67/06* (2013.01)

(58) Field of Classification Search
None
See application file for complete search history.

(56) References Cited

U.S. PATENT DOCUMENTS

| | | | | |
|---|---|---|---|---|
| 2009/0271527 A1* | 10/2009 | Appelman | .............. | H04L 29/06 709/247 |
| 2012/0089699 A1* | 4/2012 | Cholas | ................ | H04L 12/2812 709/217 |
| 2012/0173885 A1* | 7/2012 | Acar | ..................... | H04L 9/0877 713/193 |

OTHER PUBLICATIONS

"InformationTechnology—Trusted Platform Module," International Standard, ISO/IEC 11889-1:2009, May 15, 2015, 20 pp.

\* cited by examiner

*Primary Examiner* — Fatoumata Traore
(74) *Attorney, Agent, or Firm* — Shumaker & Sieffert, P.A.

(57) ABSTRACT

Techniques are disclosed for intercepting, by a customer-premises equipment (CPE), a request for a content file. The request may originate from a computing device in a local area network for the CPE and may be destined for a destination device external to the local area network for the CPE. In response to determining that an encrypted content file for the content file is stored by a storage device for the CPE, the CPE may decrypt, using at least one cryptographic key obtained from a Trusted Platform Module (TPM) for the CPE, the encrypted content file to obtain the content file. The CPE may send the content file to the computing device.

15 Claims, 5 Drawing Sheets

| CONTENT IDENTIFIERS | LOCATION | AUTHORIZED ZONES |
|---|---|---|
| https://www.domain.com/file?f=SZF1D6hn16 | C:\CACHE\SZF1D6hn16.mp4 | 110A |
| https://www.domain.com/file?f=YZ6GUySQm9 | C:\CACHE\YZ6GUySQm9.mp4 | 110A |
| https://www.domain.com/file?f=PEVNOUCnqQ | C:\CACHE\PEVNOUCnqQ.mp4 | 110A |
| https://www.domain.com/file?f=dcoyYd0P1 | C:\CACHE\dcoyYd0P1.mp4 | 110A |
| https://www.domain.com/file?f=Cs92ujaihE | C:\CACHE\Cs92ujaihE.mp4 | 110A, 110B |
| https://www.domain.com/file?f=D7foQe4FQb | C:\CACHE\D7foQe4FQb.mp4 | 110A, 110B |
| https://www.domain.com/file?f=8eWYc2NCWT | C:\CACHE\8eWYc2NCWT.mp4 | 110A, 110B |
| https://www.domain.com/file?f=kDCVsOqv4M | C:\CACHE\kDCVsOqv4M.mp4 | 110B |
| https://www.domain.com/file?f=46I86hFEQ1 | C:\CACHE\46I86hFEQ1.mp4 | 110B |
| https://www.domain.com/file?f=NO21BI2dl | C:\CACHE\NO21BI2dl.mp4 | 110B |

| ZONE | TRUSTED DEVICES |
|---|---|
| 110A | laptop 104A |
| | smartphone 104B |
| 110B | tablet 104C |
| | PDA 104D |
| 110C | employee workstation 502 |
| | employee workstation 503 |
| | employee workstation 504 |
| | employee workstation 505 |
| | employee workstation 506 |
| | employee workstation 507 |
| | employee workstation 508 |
| 110D | { } |

510 ↗ (ZONE column)  520 ↗ (TRUSTED DEVICES column)

FIG. 5

SECURE CONTENT STORAGE BY CUSTOMER-PREMISES EQUIPMENT

TECHNICAL FIELD

In general, this disclosure relates to computer network and, more specifically, to secure storage and sharing of data by customer-premises equipment (CPE).

BACKGROUND

A wide variety of subscriber devices connect to service provider networks to access resources and services provided by packet-based data networks, such as the Internet, enterprise intranets, content providers and virtual private networks (VPNs). For example, many fixed computers utilize fixed communication links, such as optical, digital subscriber line, or cable-based connections, of service provider networks to access the packet-based services. In addition, a vast amount of mobile devices, such as cellular or mobile smart phones and feature phones, tablet computers, and laptop computers, utilize mobile connections, such as cellular radio access networks of the service provider networks, to access the packet-based services.

Each service provider network typically provides an extensive access network infrastructure to provide packet-based data services to the offered services. The access network typically includes a vast collection of access nodes, aggregation nodes, and high-speed edge routers interconnected by communication links. These access devices typically execute various protocols and exchange signaling messages to anchor and manage subscriber sessions and communication flows associated with the subscribers. For example, the access devices typically provide complex and varied mechanisms for authenticating subscribers, identifying subscriber traffic, applying subscriber policies to manage subscriber traffic on a per-subscriber basis, applying various services to the traffic and generally forwarding the traffic within the service provider network.

Typically, the devices of a subscriber local area network (LAN) are connected to customer-premises equipment (CPE), such as a home router or switch located within the home of the subscriber. The CPE may connect to an access network which bridges the CPE, and corresponding LAN, to the service provider network. In some cases, the CPE operates as a layer 3 router and allocates private network addresses to devices of the LAN, which the CPE translates to a public network address of the CPE.

The devices of the subscriber may request access to content files through the service provider network, such as multimedia files, streaming video, documents, web pages, entertainment content, or other files. The large size of the content files and the quantity of content file requests may consume a proportionally large amount of network bandwidth and resources of the service provider network.

SUMMARY

In general, the disclosure describes techniques for securely caching content files to a local storage device, controlled by the CPE, for computing devices that use the CPE to access network services. For example, a CPE may include a local storage device for caching content files. The CPE may intercept a request for a digital content file ("content file") made by a computing device on the LAN and destined for a device accessible via a provider network reachable via the CPE. The CPE may examine the local storage device to determine whether the requested content file is stored locally. If the content file is stored locally, the CPE may send the stored content file to the requesting device and discard the request without further processing. If the content file is not stored locally, the CPE may forward the request for the content file to the service provider network. Upon receiving the content file from the service provider network, the CPE may store a copy of the content file to the local storage device. If a second device requests the same content file, the CPE may then retrieve the copy of the content file from local storage device and send it to the second device, instead of forwarding the request to the service provider network. Accordingly, the techniques of the disclosure may reduce the traffic on a service provider network by reducing the quantity of duplicative requests for content files made to the network, and may further reduce traffic from the service provider network to the CPE by reducing the quantity of content files sent to computing devices that access the service provider network via the CPE.

In some examples, the CPE may permit access to content files on a per-device basis. For instance, the CPE and all computing devices on the LAN of the CPE may each include a Trusted Platform Module (TPM). The CPE may use its TPM to encrypt content files cached on the local storage device. When the CPE receives a request for a content file from a subscriber device, the CPE may use its TPM to determine whether the subscriber device is authorized to access content files cached on the local storage medium. If the subscriber device is authorized, then the CPE may use its TPM to decrypt the content file and may forward the content file to the requesting device. When the CPE receives a content file from the service provider network, the CPE may use its TPM to encrypt a copy of the content file, and store this encrypted copy file on the local storage medium. To further enhance security, the CPE may delete the encrypted content file from the local storage medium after a predetermined time. Accordingly, the techniques of the disclosure provide for secure storage and maintenance of locally cached content files, such that consumption of the resources of the service provider network may be reduced, while facilitating data security within the LAN.

In one example, this disclosure describes a method including intercepting, by a customer-premises equipment (CPE), a request for a content file, wherein the request originates from a computing device in a local area network for the CPE and is destined for a destination device external to the local area network for the CPE; in response to determining that an encrypted content file for the content file is stored by a storage device for the CPE, decrypting, by the CPE using at least one cryptographic key obtained from a Trusted Platform Module (TPM) for the CPE, the encrypted content file to obtain the content file; and sending, by the CPE to the computing device, the content file.

In another example, this disclosure describes a customer-premises equipment (CPE) including one or more processors operably coupled to a memory; a Trusted Platform Module (TPM); and a storage device; wherein the one or more processors are configured to: intercept a request for a content file, wherein the request is originated from a computing device in a local area network for the CPE and is destined for a destination device external to the local area network for the CPE; in response to determining that an encrypted content file for the content file is stored by the storage device, decrypt, using at least one cryptographic key obtained from the TPM, the encrypted content file to obtain the content file; and send, to the computing device, the content file.

In another example, this disclosure describes a non-transitory computer-readable medium including instructions for causing at least one programmable processor of a customer-premises equipment (CPE) to intercept a request for a content file, wherein the request originates from a computing device in a local area network for the CPE and is destined for a destination device external to the local area network for the CPE; in response to determining that an encrypted content file for the content file is stored by a storage device for the CPE, decrypt, using at least one cryptographic key obtained from a Trusted Platform Module (TPM) for the CPE, the encrypted content file to obtain the content file; and send, to the computing device, the content file.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters denote like elements throughout the figures and text.

DETAILED DESCRIPTION

Figure 1:
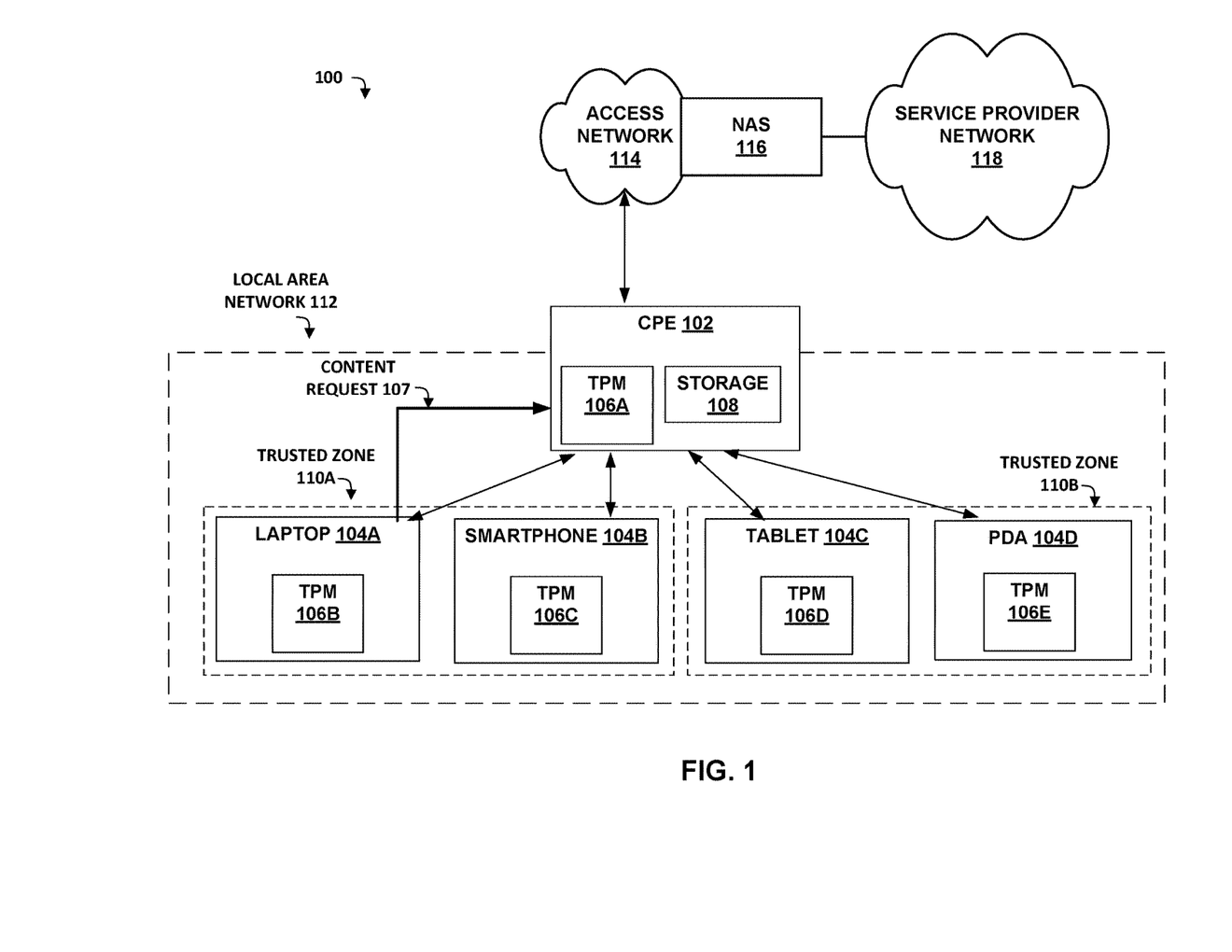
FIG. 1 is a block diagram illustrating an example network according to techniques of the disclosure.

FIG. 1 is a block diagram illustrating an example system according to techniques of the disclosure. System 100 may include a service provider network 118, an access network 114, and a local area network 112. LAN 112 may be a computer network that interconnects subscriber devices, such as laptop 104A, smartphone 104B, tablet 104C, and PDA 104D (collectively, "devices 104"), within a limited area such as a residence, school, laboratory, or office building.

Service provider network 118 may operate as a private network that provides packet-based network services to customer devices on the network. As examples, service provider network 118 may provide Internet access, bulk data delivery, voice over Internet protocol (VoIP), Internet Protocol television (IPTV), Short Messaging Service (SMS), Wireless Application Protocol (WAP) service, Telnet, or customer-specific application services. Service provider network 1118 may include, for instance, a local area network (LAN), a wide area network (WAN), the Internet, a virtual LAN (VLAN), an enterprise LAN, a layer 3 virtual private network (VPN), an Internet Protocol (IP) intranet operated by a network service provider that also operates access network 114, an enterprise IP network, or some combination thereof. In various embodiments, service provider network 118 may be connected to a public WAN, the Internet, or to other networks. Service provider network 118 executes one or more packet data protocols (PDPs), such as IP (IPv4 and/or IPv6), X.25, or Point-to-Point Protocol (PPP), to enable packet-based transport of service provider network 118 services. Service provider network 118 may provide seamless end-to-end service from a core-facing edge of a service provider network through aggregation and access infrastructure out to access nodes of access network 114 located proximate to subscriber devices, such as devices 104.

Devices 104 may be, for example, personal computers, laptop computers or other types of computing device associated with subscribers. Devices 104 may comprise, for example, mobile telephones, laptop or desktop computers having, e.g., a 3G wireless card, wireless-capable netbooks, video game devices, pagers, smart phones, personal data assistants (PDAs) or the like. Each of devices 104 may run a variety of software applications, such as word processing and other office support software, web browsing software, software to support voice calls, video games, videoconferencing, and email, among others.

Access network 114 may operate at the borders of service provider network 118 and apply network services, such as authorization, policy provisioning, and network connectivity, to network traffic associated with devices 104 of LAN 112. In the example of FIG. 1, for ease of explanation, service provider network 118 is shown as having a single Network Access Server (NAS) 116 within access network 114, although service provider network 118 may typically service thousands of access nodes. NAS 116 may act as a gateway to authenticate the credentials of customer-premises equipment (CPE) 102 before permitting CPE 102 and devices 104 of LAN 112 to access service provider network 118.

Customer-premises equipment (CPE) 102, located within the customer or subscriber's home or workplace, may act as a bridge to pass communications between devices 104 of LAN 112 and service provider network 118. CPE 102 may implement one or more LAN-to-WAN connectivity protocols (i.e., PPPoE and PPPoA) to bridge communications between LAN 112 and service provider network 118 without requiring the installation of a WAN client at the end user device on the LAN. CPE 102 may incorporate a PPP bridge in conjunction with a WAN client to provide Point-to-Point ("PPP")-based connectivity between the LAN and the WAN, thereby eliminating the need to implement a WAN client at the end user device. CPE 102 may perform functions such as L3 routing and IP forwarding, firewall services, network address translation (NAT) or carrier grade-NAT (CG-NAT) services, Dynamic Host Configuration Protocol (DHCP) services, and/or network provisioning. CPE 102 may perform Unified Threat Management ("UTM") services. CPE 102 may in some examples act as a wireless access point for customer devices connecting via a wireless protocol such as IEEE 802.3. CPE 102 may in some examples implement telephony and VoIP functions. CPE 102 may in some examples discover computing devices in the customer premises. CPE 102 may represent a telephone, router, switch, dial-up modem, asynchronous or synchronous digital subscriber line (xDSL) modem, cable modem, residential gateway, set-top box, fixed mobile convergence product, home networking adaptor and/or Internet access gateway.

According to techniques of the disclosure, CPE 102 includes a local storage device 108 to store cached content files received from service provider network 118 or any of devices 104. Local storage device 108 may be random access memory (RAM), read only memory (ROM), programmable read only memory (PROM), erasable programmable read only memory (EPROM), electronically erasable programmable read only memory (EEPROM), Flash memory. Local storage device 108 may represent a hard disk. In some examples, local storage device 108 may be implemented as a subcomponent of CPE 102. In other examples, local storage medium 108 may be connected to CPE 102 via a network. In other examples, local storage device 108 may be distributed across a network of computing devices. In some examples, CPE 102 may protect the security of data cached within local storage device 108 by using TPM 106A to encrypt and decrypt data stored on local storage device 108.

Each of devices 104 and CPE 102 may include a corresponding one of TPM 106A-106E (collectively, "TPMs 106"). Each TPM 106 may include a dedicated microprocessor designed to provide cryptographic security by integrating hardware-embedded cryptographic keys into computing devices, such as laptops, PDAs, smartphones, tablets, etc. TPM 106 may provide secure generation of cryptographic keys and a secure random number generator for use by various applications running on the device. TPM 106 may be used to ensure the integrity of the device platform, provide data encryption, and password protection. TPM 106 may also be used to provide digital rights management (DRM) and enforcement of software licenses.

TPM 106 may also provide cryptographic services, such as remote attestation, binding, and sealing capabilities. In remote attestation, TPM 106 may create a nearly unforgeable hash key summary of the hardware and software configured on the device. This process may allow a third party to remotely verify that the hardware or software of the device have not been altered or tampered with. In binding, TPM 106 may encrypt data using a TPM bind key, which may be a unique private key. In sealing, TPM 106 may encrypt data using a TPM bind key much like binding. However, in sealing, TPM 106 may also specify a software state of TPM 106 required to unseal or decrypt the data. The standards for implementing TPMs, such as TPM 106, are set forth in ISO/IEC 11889-1:2009 and ISO/IEC 11889-1:2015, both of which are incorporated herein in their entirety.

According to techniques of the invention, one of devices 104, such as laptop 104A, may send a content request 107 to obtain a content file from service provider network 118. Examples of such requests may be made through protocols such as File Transfer Protocol ("FTP"), Hypertext Transfer Protocol ("HTTP"), Internet Messaging Access Protocol ("IMAP"), Media Gateway Control Protocol ("MGCP"), Post Office Protocol ("POP"), Real-time Transport Protocol ("RTP"), Simple Mail Transfer Protocol ("SMTP"), Secure Shell ("SSH"), Transport Layer Security/Secure Sockets Layer ("TLS/SSL" or "SSL"), or Extensible Messaging and Presence Protocol ("XMPP").

This content request 107 is sent via CPE 102 for forwarding to service provider network 118. CPE 102 may intercept the content request 107 and require laptop 104A to authenticate to CPE 102. Laptop 104A may use TPM 106B to authenticate to TPM 106A of CPE 102. In some examples, TPM 106B may authenticate to TPM 106A according to TPM-based authentication. If CPE 102 is unable to authenticate laptop 104A, CPE 102 may deny laptop 104A access to the content file cached on local storage device 108. In some examples, upon failed authentication, CPE 102 may discard the request by laptop 104A without further processing because it is an untrusted device. In other examples, upon failed authentication, CPE 102 may forward the request to service provider network 118 for servicing.

In some examples, CPE 102 may determine whether laptop 104A is authorized to access the content file sought by content request 107. CPE 102 may determine whether laptop 104A is authorized to access the content file by determining whether laptop 104A belongs to a zone of trusted devices permitted to access the content file. If CPE 102 determines that laptop 104A is not authorized to access cached content files, i.e., a trusted device, CPE 102 may deny laptop 104A access to the content file cached on local storage device 108. In some examples upon failed authorization, CPE 102 may discard the request by laptop 104A without further processing. In other examples upon failed authorization, CPE 102 may forward the request to service provider network 118 for servicing.

If CPE 102 determines that laptop 104A is an authenticated device (i.e., a "trusted device" according to TPM-based authentication) and authorized to access cached content, it may query local storage device 108 to determine if local storage device 108 has cached the requested content file. If local storage device 108 stores the requested content file, CPE 102 may use TPM 106A to decrypt the cached content file to obtain the unencrypted content file. CPE 102 may transmit the unencrypted content file to laptop 104A such that transmitting the cached content file is transparent to laptop 104A. In other words, laptop 104A may be unable to determine that the content file has been obtained from CPE 102 rather than via service provider network 118. CPE 102 may discard the request for the content file from laptop 104A without forwarding the request to service provider network 118. If CPE 102 determines that local storage device 108 does not possess the requested content file, it may forward the request for the content file to service provider network 118.

In some examples, CPE 102 may first determine whether storage 108 has stored a copy of the content file sought by content request 107. If storage 108 does possess a copy of the requested content file, CPE 102 may then determine whether the requesting device may be authenticated and is authorized to access the content file., CPE 102 may use TPM 106A to decrypt the cached content file to obtain the unencrypted content file. CPE 102 may transmit the unencrypted content file to laptop 104A such that transmitting the cached content file is transparent to laptop 104A.

Upon receiving a content file from service provider network 118, CPE 102 may use TPM 106A to encrypt a copy of the content file. CPE 102 may store the encrypted copy of the content file within local storage device 230. CPE 102 may forward the unencrypted content file to the appropriate requesting device. If a second device, such as smartphone 104B, requests the same content file, CPE 102 may authenticate the second device. If smartphone 104B is properly authenticated, then CPE 102 may use TPM 106A decrypt the encrypted content file stored within local storage device 108. CPE 102 may forward the unencrypted content file to smartphone 104B. CPE 102 may discard the request for the content file from smartphone 104B without forwarding the request to service provider network 118, thereby alleviating some traffic between CPE 102 and service provider network 118.

In some examples, CPE 102 may provide additional security safeguards to the encrypted content file cached within local storage device 108. For example, CPE 102 may delete encrypted content files after a predetermined time. In other examples, CPE 102 may delete encrypted content files after it has not been accessed for a predetermined amount of time. In further examples, CPE 102 may not decrypt encrypted content files cached within local storage device 108, but instead forward the encrypted content file directly to an authorized device, such as laptop 104A. In this example, laptop 104A may use its own TPM, e.g., TPM 106B, to locally decrypt the encrypted content file. In this example, the content file may remain encrypted whenever it is transmitted across the network, further heightening data security within LAN 112.

In some examples, CPE 102 may organize devices 104 into one or more trusted zones 110A-110B (collectively, "trusted zones 110"). Each zone 110 represents a group of computing devices 104 having common authorization to access content files associated with any of the computing devices 104 in the group. Each computing device 104 within a trusted zone may permit other computing devices 104 within the same trusted zone to access content files stored by CPE 102 on local storage device 108. Further, CPE 102 may prevent a computing device that is not a member of a zone from accessing content files associated with a computing device that is a member of the zone. Thus, the creation of trusted zones may allow for the further organization and security of data cached by local storage device 108 by identifying and categorizing devices permitted to access various data stored by local storage device 108. In some examples, each of zones 110 may be associated with and managed by a single user.

With respect to the example of FIG. 1, CPE 102 store data defining zones, e.g., laptop 104A and smartphone 104B as members of trusted zone 110A, and tablet 104C and PDA 104D into trusted zone 110B. Laptop 104A may send a request for a content file, such as a particular video, to CPE 102, and CPE 102 may store an encrypted copy of the video on local storage device 108, according to techniques discussed above. Smartphone 104B may subsequently send a request for the same video to CPE 102. Smartphone 104B may use TPM 106C to authenticate itself to TPM 106A and verify that it is a member of trusted zone 110A. CPE 102 may retrieve the requested video from local storage device 108 and send requested video to smartphone 104B.

In the above example, tablet 104C is not a member of trusted zone 110A. If tablet 104C requests the same video as requested by laptop 104A, it will be unable to verify to CPE 102 that it is a member of trusted zone 110A. Accordingly, CPE 102 may deny tablet 104C access to the requested video stored within local storage device 108.

In some examples, a network administrator or other authorized personnel may access CPE 102 to create, remove, or modify trusted zones within LAN 112. For example, the network administrator may add tablet 104C to trusted zone 110A, remove smartphone 104B from trusted zone 110A, or create a new trusted zone. In some examples, access to CPE 102 may be restricted to users associated with devices 104A that are authenticated using TPMs 106 to ensure the integrity and security of LAN 112 by preventing unauthorized modification of trusted zones 110.

In further examples of the techniques of the disclosure, a TPM may be implemented in a data caching facility to provide secure caching and storage, such as a web caching and proxy forwarding facility (i.e., Squid). In such an example, proxy communications with a requested server may be authenticated and authorized using different cryptographic keys stored within the TPM. Further, both the client and the proxy may use the random number generator properties of a TPM (i.e., TrueRNG) to further facilitate secure communication.

The architecture of system 100 illustrated in FIG. 1 is shown for exemplary purposes only. The techniques as set forth in this disclosure may be implemented in the example system 100 of FIG. 1, as well as other types of network configurations not described specifically herein. Nothing in this disclosure should be construed so as to limit the techniques of this disclosure to the example architecture illustrated by FIG. 1.

Accordingly, the techniques of the disclosure allow a CPE to locally cache a content file for subsequent use. Thus, the CPE of the present disclosure may retrieve a content file that is repeatedly requested by subscriber devices from local storage instead of from the service provider network. Thus, the techniques of the disclosure may reduce the quantity of duplicative requests for a content file made to the service provider network, and therefore reduce the consumption of network resources and bandwidth in the service provider network. Further, the techniques of the disclosure may implement a TPM to provide for secure storage and access of locally stored content files, so that robust data security and device authentication policies may be enforced throughout the LAN.

Figure 2:
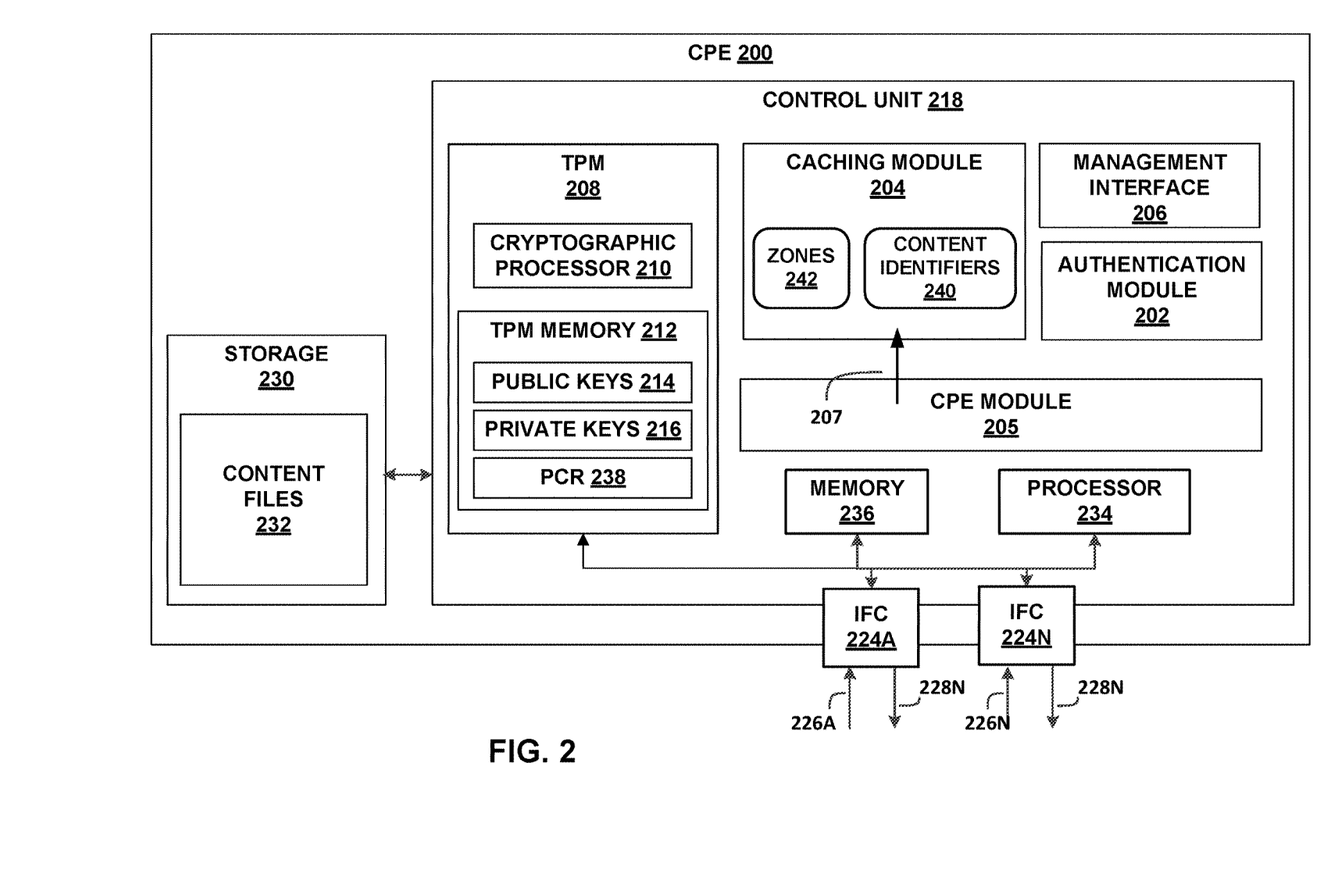
FIG. 2 is a block diagram illustrating an example CPE according to techniques of the disclosure.

FIG. 2 is a block diagram illustrating an example CPE according to techniques of the disclosure. In general, CPE 200 may operate substantially similar to CPE 102 of FIG. 1. In this example, CPE 200 may include interface cards 224A-224N ("IFCs 224") that receive packets via incoming links 226A-226N ("incoming links 226") and send packets via outbound links 228A-228N ("outbound links 228"). IFCs 224 are typically coupled to links 226, 228 via a number of interface ports. CPE 200 may also include a control unit 218 that determines routes of received packets and forwards the packets accordingly via IFCs 224.

Control unit 218 may include a CPE module 205 for performing typical functions of a CPE. In some examples, CPE module 205 may perform functions such as L3 routing and IP forwarding, firewall services, NAT or CGNAT services, and/or Dynamic Host Configuration Protocol (DHCP) services. In some examples, CPE module 205 may implement a DHCP server. The DHCP server may be adapted to assist in the configuration of the IP addresses and gateway IP addresses used by IFCs 224 and the one or more devices 106. CPE module 205 may discover computing devices in the customer premises. CPE module 205 may implement a network discovery service, such as UPnP, that automatically acts to discover computing devices 106 connected to CPE 200 at a premises. In other examples, when CPE 200 is initially turned on, CPE module 205 may search the local network for a DHCP server.

According to techniques of the disclosure, CPE 200 may include TPM 208 to provide cryptographic security. TPM 208 may provide secure generation of cryptographic keys and a secure random number generator for use by various applications running on the device. TPM 208 may be used to ensure the integrity of the device platform, provide data encryption, and password protection. TPM 208 may also be used to provide digital rights management (DRM) and enforcement of software licenses.

TPM 208 may include a cryptographic processor 210. Cryptographic processor 210 may include one or more processors, such as microprocessors, digital signal processors (DSPs), application specific integrated circuits (ASICs), field programmable gate arrays (FPGAs), or any other equivalent integrated or discrete logic circuitry, as well as any combinations of such components.

TPM 208 may further include TPM memory 212. TPM memory 212 may be random access memory (RAM), read only memory (ROM), programmable read only memory (PROM), erasable programmable read only memory (EPROM), electronically erasable programmable read only memory (EEPROM), flash memory, comprising executable instructions for causing the one or more processors to perform the actions attributed to them. Further, this memory may be implanted entirely in hardware, software, or a combination thereof. TPM memory 212 may include at least one public key 214 and at least one private key 216 (collectively, cryptographic keys 214, 216). Further, TPM memory 212 may include one or more Platform Configuration Registers (PCRs) 238 for securely recording the state of the platform.

In some examples, cryptographic processor 210 of TPM 208 may use cryptographic keys 214, 216 to securely encrypt data. This data may remain secure because it may only be decrypted using cryptographic keys 214, 216, which are kept private to TPM 208. In some examples, one or more public keys 214 may be shared with trusted devices outside of CPE 200 to allow the secure transfer of encrypted data between trusted devices and decryption of data within a trusted device.

In further examples, TPM 208 may use PCR 238 to record the state of the platform and use this information in conjunction with cryptographic keys 214, 216 to securely encrypt data. In this example, the data may only be decrypted if the platform remains in the same state as was recorded by PCR 238. This functionality allows TPM 208 to ensure that the software or hardware of the platform has not changed, as may be the case if the software of the platform is compromised in an attempt to breach its cryptography and access or decrypt encrypted data without proper authorization.

CPE 200 may include a local storage device 230. In general, local storage device 230 may function substantially similarly to local storage medium 118 of FIG. 1. Local storage device 230 may be volatile or non-volatile memory, such as random access memory (RAM), erasable programmable read only memory (EPROM), Flash memory. Local storage device 230 may represent one or more hard disks. In some examples, local storage device 230 may be implemented as a subcomponent of CPE 200. In other examples, local storage device 230 may be connected to CPE 200 via a network or a peripheral interface such as Universal Serial Bus (USB). In other examples, local storage device 230 may be distributed across a network of computing devices.

In some examples, local storage device 230 may store one or more content files 232, such as multimedia files, streaming video and audio files, or other content files, where each content file stored to storage 230 is identifiable by a unique identifier. In some examples, the unique identifier may indicate a uniform resource locator (URL) or network address. In some examples, content files 232 may be stored in encrypted or unencrypted form.

CPE 200 may include a caching module 204 to manage content file caching to storage device 230 and manage access to cached content files by subscriber devices that access a service provider network via CPE 200. Caching module 204 may store one or more content identifiers within content identifiers 240, each content identifier uniquely identifying and referencing a location for a content file stored to storage 230. The location may represent a file path for a file system of storage 230 or other reference by which CPE may retrieve the stored content file, for instance. Content identifiers 240 may represent a data structure having one or more entries that each maps a content identifier for a content file to a location for the content file in storage 230. For example, content identifiers 240 may represent a table, list, map, or other associative data structure. A content identifier in content identifiers 240 to indicate a content file may represent an indication of a URI from which the content file was originally requested, such as the URI itself or a hash of the URI.

A subscriber device that accesses a service provider network via CPE 200 may send a content request 207 to CPE 200 for forwarding to the service provider network. CPE module 205 may intercept the content request 207 for analysis and determine that the content request 207 is a request for a content file. Caching module 204 inspects content request 207 to determine a content identifier for the content file and determines whether content identifiers 240 includes a matching content identifier.

If caching module 204 determines content identifiers 240 does not include a matching content identifier for the content request 207, storage device 230 does not store the requested content file. CPE module 205 therefore forwards the content request 207 to the service provider network.

If however the caching module 204 determines content identifiers 240 includes a matching content identifier for the content request 207, the requested content file is cached within local storage device 230. Caching module 204 may in some examples obtain the content file from storage device 230 and generate a response to content request 207 that includes the content file. The response may be transparent to the requesting device, such that the requesting device may be unable to determine whether the response originated from CPE 200 or a destination device indicated by content request 207. To generate the response, CPE 200 may spoof the destination device by specifying the destination device a source of the response.

In some examples, the content file is encrypted. Caching module 204 in such cases first decrypts the encrypted content file using TPM 208 in order to obtain the content file. Caching module 204 then generates the response including the content file in unencrypted form.

In some examples, caching module 204 may determine whether a device that originated content request 207 and requesting access to one or more content files 232 of local storage device 230 belongs to a trusted zone of devices 240 permitted to access the content files. Trusted zones 240 may possess one or more trusted zones, each of which may identify one or more devices belonging to the group. In the above example, content files requested by a first device within a trusted zone may be cached within storage 230 and subsequently shared with members of the same trusted zone. For example, Caching module 204 may provision trusted zone 110A and add laptop 104A and smartphone 104B as members of trusted zone 110A. Laptop 104A may request a content file, and caching module 204 may cache the content file within storage 230 in the course of satisfying the request. If smartphone 104B subsequently requests the same content file, caching module 204 may query trusted zones 240 and determine that smartphone 104B is a member of the same trusted zone as laptop 104A (i.e., trusted zone 110A).

An administrator or other authorized personnel may access management interface 206 of CPE 200 to configure zones 242. Example management interfaces may include command line interfaces ("CLIs"), graphical user interfaces ("GUIs"), browser-based interfaces, mobile device application or "app" interfaces, and the like. In some examples, management interface 206 may be used to add or remove devices to or from a list of trusted devices for CPE 200, i.e., devices authorized to access content files cached by CPE 200 to storage device 230. As a further example, a customer using management interface 206 may add or remove devices to a list of trusted zones within zones 242, or to create, modify, or delete trusted zones 242. Each trusted zone of the one or more trusted zones of zones 242 indicates a list of trusted devices that are authorized to access content files associated with any other trusted device of the trusted zone. As a further example, management interface 206 may be used to configure or perform maintenance on TPM 208. Zones 242 may represent a table, list, map, or other associative data structure to associate each zone with one or more devices.

For example with respect to laptop 104 of FIG. 1, processor 234 may execute software represented by authentication module 202 to authenticate laptop 104A. Authentication module 202 and laptop 104A may perform handshaking using cryptographic keys provided by their respective TPMs to establish the authenticity of laptop 104A. In some examples, authentication module 202 may include a table of authorized devices and their cryptographic keys. If authentication module 202 successfully authenticates laptop 104A, caching module 204 may authorize laptop 104A to access content files 232 cached within storage device 230 according to a membership of the laptop 104A in a trusted zone of zones 242. If laptop 104A is authorized to access content files 232 and storage 230 stores the content file requested by laptop 104A, caching module 204 generates a response to content request 207 as described above. Having generated and sent a response to content request 207, including the requested content file, CPE 200 may discard content request 207 without forwarding the content request 207 upstream to the service provider network.

In some examples, CPE 200 may receive content file via incoming links 226 from service provider network 118 that is destined for a device, such as laptop 104A. CPE 200 may use TPM 208 to encrypt a copy of the content file. CPE 200 may cache the encrypted content file within local storage device 230, as well as add to content identifiers 240 a mapping of a unique identifier, such as an URL for the content file, to a storage location of storage device 230. CPE 200 may forward an unencrypted copy of the data to laptop 104A along outgoing links 228.

In some examples, CPE 200 may include one or more processors 234, such as microprocessors, digital signal processors (DSPs), application specific integrated circuits (ASICs), field programmable gate arrays (FPGAs), or any other equivalent integrated or discrete logic circuitry, as well as any combinations of such components. Further, CPE 200 may include memory 236, such as random access memory (RAM), read only memory (ROM), programmable read only memory (PROM), erasable programmable read only memory (EPROM), electronically erasable programmable read only memory (EEPROM), flash memory, comprising executable instructions for causing the one or more processors to perform the actions attributed to them. For example, one or more processors 234 may execute instructions stored to memory 236 for performing techniques attributed herein to caching module 204, authentication module 202, and management interface 206.

In some examples, the one or more processors 234 and memory 236 of CPE 200 may implement the features of CPE 200 on a single computing device. In other examples, one or more processors 234 and memory 236 of CPE 200 may be distributed across a network of computing devices which collectively implement the features of CPE 200.

In some examples, CPE 200 may detect a duplicate request for content file 232 stored within local storage device 230 from, for example, smartphone 104B. In one example, authentication module 202 may use TPM 208 to determine whether smartphone 104B is authorized to access one or more content files 232. In another example, authentication module 202 may use TPM 208 to determine whether smartphone 104B belongs to the same trusted zone as laptop 104A (i.e., trusted zone 110A). If smartphone 104B is authorized to access one or more content files 232, then CPE 200 may use TPM 208 to decrypt the requested content file and pass it to control unit 218 for routing to smartphone 104B. CPE 200 may then discard the request for the content file from smartphone 104B without forwarding the request to service provider network 118.

The architecture of CPE 200 illustrated in FIG. 2 is shown for exemplary purposes only. The techniques as set forth in this disclosure may be implemented in the example CPE 200 of FIG. 2, as well as other types of CPEs not described specifically herein. For example, some of the functionally of control unit 218 may be distributed within IFCs 224. In another example, control unit 218 may comprise a plurality of packet forwarding engines operated as slave routers. Nothing in this disclosure should be construed so as to limit the techniques of this disclosure to the example architecture illustrated by FIG. 2.

Accordingly, the techniques of the disclosure allow a CPE to locally cache content files for subsequent use. Thus, the CPE of the present disclosure may retrieve a content file that is repeatedly requested by subscriber devices from local storage instead of from the service provider network. Thus, the techniques of the disclosure may reduce the quantity of duplicative requests for content files made to the service provider network, and therefore reduce the consumption of network resources and bandwidth in the service provider network. Further, the techniques of the disclosure may implement a TPM to provide for secure storage and access of locally stored content files, so that robust data security and device authentication policies may be enforced throughout the LAN.

Figure 3:
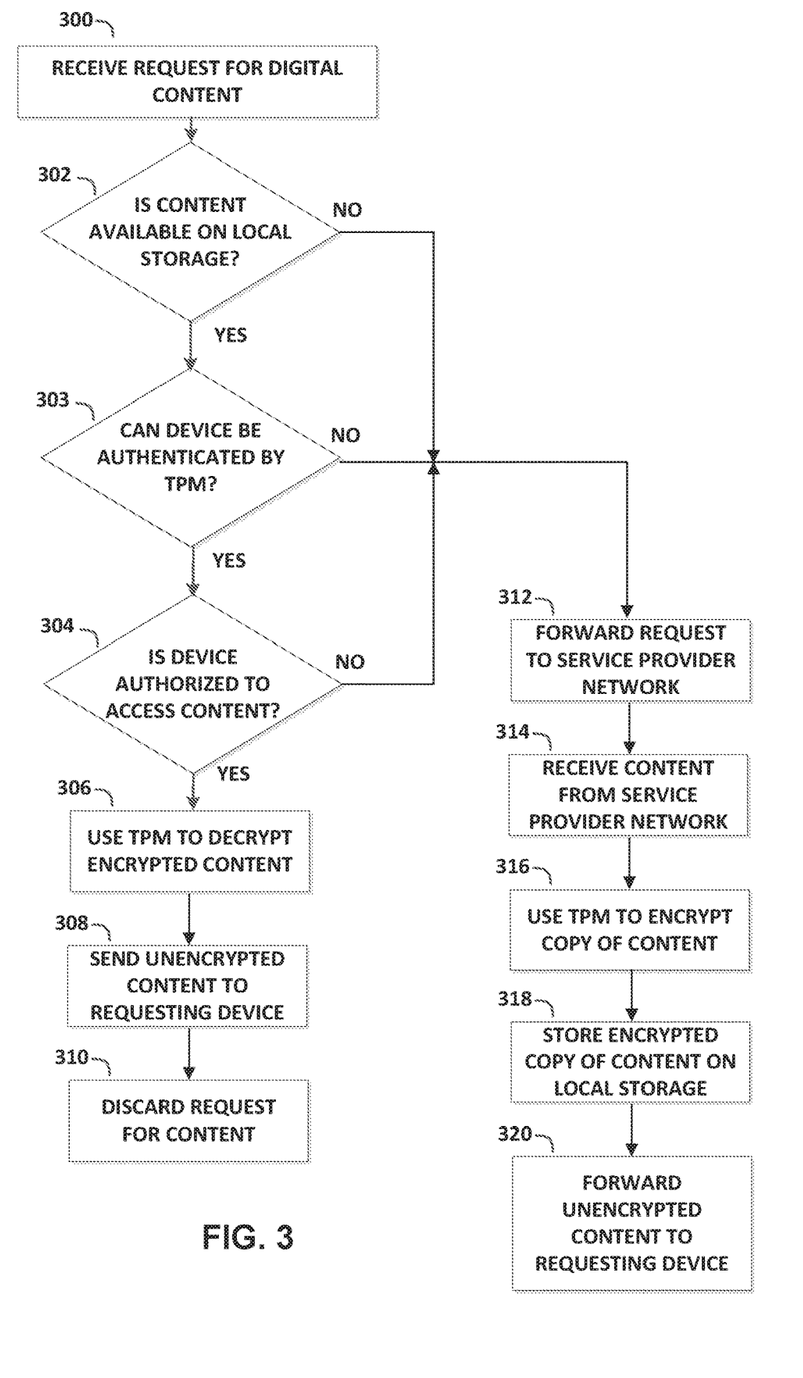
FIG. 3 is a flowchart of an example method for delivering content files to a computing device according to techniques of the disclosure.

FIG. 3 is a flowchart of an example method for delivering content files to a computing device according to techniques of the disclosure. For convenience, FIG. 3 is described with respect to FIGS. 1 and 2. CPE 200 may receive a request for a content file from a subscriber device, such as laptop 104A (300). CPE 200 may determine whether the requested content file is cached within the local storage (302). In some examples, CPE 200 may search a table of content identifiers 240 for an identifier corresponding to the requested content file. If CPE 200 determines that it has cached the requested content file (YES branch of 302), then CPE 200 may use authentication module 202 and TPM 208 to determine whether laptop 104A may be authenticated (303). Once authentication module 202 has authenticated laptop 104A (YES branch of 303), caching module 204 may examine zones 242 to determine whether laptop 104A belongs to a zone of trusted devices authorized to access encrypted data 232 cached within local storage 230 (302). If laptop 104A is authorized to access the requested content file (YES branch of 304), then CPE 200 may use TPM 208 to decrypt a copy of the requested content file (306). CPE 200 may then forward the unencrypted copy of the requested content file to laptop 104A (308). CPE 200 may discard the request for content file from laptop 104A without forwarding the request to service provider network 118 (310).

If the requested content file is not cached within local storage 230 (NO branch of 302), if authentication module 202 cannot authenticate laptop 104A to access one or more content files 232 (NO branch of 303), or if laptop 104A is not authorized to access the requested content file (NO branch of 304), then CPE 200 may forward the request to service provider network 118 via outgoing links 228 (312). CPE 200 may receive the requested content file from service provider network 118 via incoming links 226 (314). CPE 200 may use TPM 208 to encrypt a copy of the received content file (316). CPE 200 may then store the encrypted copy of the content file on local storage device 230 (318). In some examples, CPE 200 may also add a unique identifier for the content file, such as an URL or network address, to a table of content file identifiers 240 in association with a location of the stored, encrypted copy of the content file on local storage device and, in some cases, in association with a zone for the laptop 104A that originated the request for the content file. CPE 200 may forward the unencrypted content file to laptop 104A via outgoing links 228 (320).

Accordingly, the techniques of the disclosure may allow a CPE to locally cache content file for subsequent use. Thus, the CPE of the present disclosure may retrieve a content file that is repeatedly requested by subscriber devices from local storage instead of from the service provider network. Thus, the techniques of the disclosure may reduce the quantity of duplicative requests for content files made to the service provider network, and therefore reduce the consumption of network resources and bandwidth in the service provider network. Further, the techniques of the disclosure may implement a TPM to provide for secure storage and access of locally stored content files, so that robust data security and device authentication policies may be enforced throughout the LAN.

Figure 4:
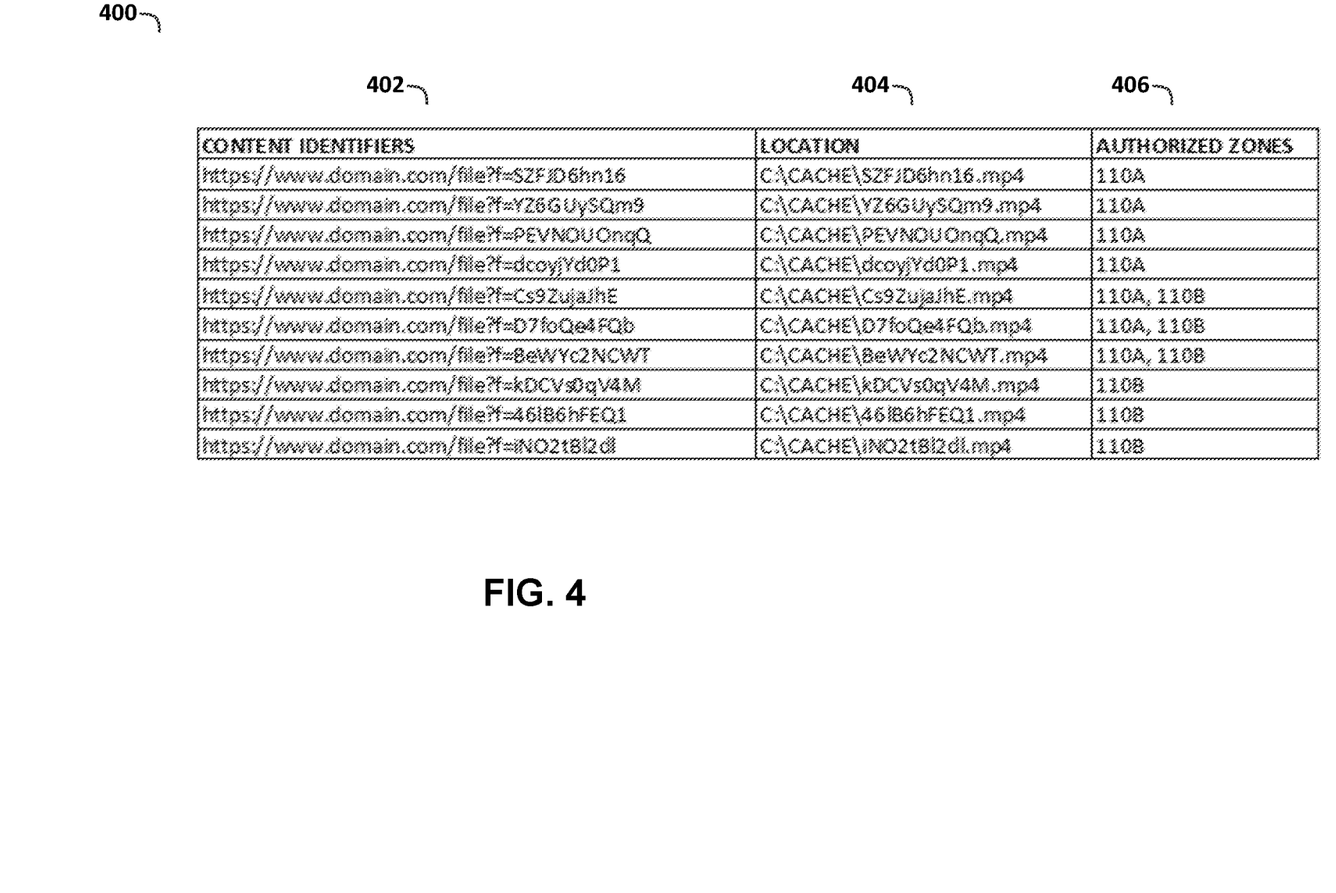
FIG. 4 is an example table of content identifiers according to techniques of the disclosure.

FIG. 4 is an example table of content identifiers 400 according to techniques of the disclosure. Table of content identifiers 400 may represent an example instance of content identifiers 240 maintained by caching module 204 of FIG. 2, as described above. In some examples, caching module 204 may maintain table of content identifiers 400 in memory as a list, table, tuple, or other data structure. In some examples, table of content identifiers 400 may include a column describing content identifiers 402. Each item in column 402 of content identifiers may describe one or more content files 232 cached by storage 230. In some examples, each content identifier may be an URL or web link to a content file available via the Internet. In some examples, table of content identifiers 400 may include a column 404 describing the location in storage 230 of each content file identified by the corresponding content identifier in column 402. In some examples, table of content identifiers 400 may include a column 406 indicating one or more trusted zones permitted to access the corresponding content file. In some examples, caching module 204 may only permit those devices belonging to a trusted zone indicated by column 406 to access the corresponding content file.

The table of content identifiers 400 illustrated in FIG. 4 is shown for exemplary purposes only. The techniques as set forth in this disclosure may be implemented in the example table of content identifiers 400 of FIG. 4, as well as other types of tables or lists not described specifically herein. Nothing in this disclosure should be construed so as to limit the techniques of this disclosure to the example table of content identifiers 400 illustrated by FIG. 4.

Figure 5:
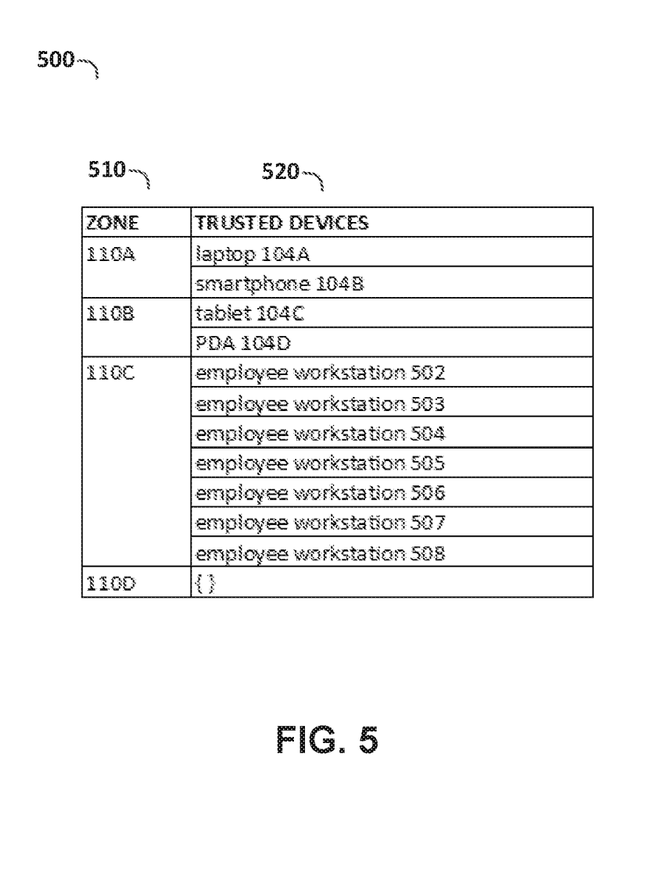
FIG. 5 is an example table of trusted zones according to techniques of the disclosure.

FIG. 5 is an example table of trusted zones 500 according to techniques of the disclosure. In general, table of trusted zones 500 may represent an example instance of trusted zones 242 maintained by caching module 204 of FIG. 2, as described above. In some examples, caching module 204 may maintain table of trusted zones 500 in memory as a list, table, tuple, or other data structure. In some examples, table of trusted zones 500 may include a column 510 of zones configured for CPE 200. In some examples, caching module 204 may create, modify, and remove these zones. In some examples, table of trusted zones 500 may include a column 520 of devices belonging to the corresponding zone in column 510. In the example of FIG. 5, zone 110A may include laptop 104A and smartphone 104B of FIG. 1, and zone 110B may include tablet 104C and PDA 104D of FIG. 1. In the example of FIG. 5, zones 110A and 110B may be used to identify trusted computing devices in on the LAN 112 of a home user. In some examples, caching module 204 may define a zone 110C, which may include employee workstations 502-508. In the example of FIG. 5, zone 110C may correspond to employee computers in a business environment, to identify trusted computing devices in a computer network of a business. In another example, caching module 204 may provision trusted zone 110D, and add computing devices to the zone at a later time.

The table of table of trusted zones 500 illustrated in FIG. 5 is shown for exemplary purposes only. The techniques as set forth in this disclosure may be implemented in the example table of trusted zones 500 of FIG. 5, as well as other types of tables or lists not described specifically herein. Nothing in this disclosure should be construed so as to limit the techniques of this disclosure to the example table of trusted zones 500 illustrated by FIG. 5.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules, or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A method comprising:
receiving, by a customer-premises equipment (CPE), configuration data identifying one or more computing devices of a local area network for the CPE as members of a trusted zone;
storing, by the CPE and in a storage device for the CPE, an association between an encrypted content file and a second computing device of the one or more computing devices, wherein the second computing device is a member of the trusted zone and the encrypted content file is an encrypted form of a content file;
intercepting, by the CPE, a request for the content file, wherein the request originates from a first computing device of the one or more computing devices of the local area network for the CPE and is destined for a destination device external to the local area network for the CPE, and wherein the first computing device is a member of the trusted zone;
determining, by the CPE, that the encrypted content file is stored by the storage device for the CPE and that the CPE stores an association of the encrypted content file and the second computing device that is also a member of the trusted zone;
in response to the determining, decrypting, by the CPE using at least one cryptographic key obtained from a Trusted Platform Module (TPM) for the CPE, the encrypted content file to obtain the content file; and
sending, by the CPE to the first computing device, the content file.

2. The method of claim 1, wherein the request comprises a first request and the content file comprises a first content file, the method further comprising:
receiving, by the CPE, a second request for a second content file, wherein the second request is destined for the destination device; and
in response to determining that an encrypted content file for the second content file is not stored by the storage device, forwarding, by the CPE, the second request to the destination device.

3. The method of claim 1, further comprising:
authenticating, by the CPE using the at least one cryptographic key obtained from the TPM, the computing device to access the encrypted content file.

4. The method of claim 1, wherein decrypting using the at least one cryptographic key obtained from the TPM for the CPE comprises decrypting using the at least one cryptographic key obtained from the TPM and at least one software state obtained from a Platform Configuration Register of the TPM.

5. The method of claim 1, further comprising deleting, by the CPE, the encrypted content file from the storage device after a predetermined time.

6. The method of claim 1, wherein the request for the content file comprises a first request, the method further comprising:
intercepting, by the CPE, a second request for the content file, wherein the second request originates from the second computing device of the one or more computing devices of the local area network for the CPE and is destined for the destination device external to the local area network for the CPE;
in response to determining that that the encrypted content file for the content file is not stored by the storage device for the CPE:
receiving, from the destination device external to the local area network for the CPE, the content file;
encrypting, using the at least one cryptographic key obtained from the TPM for the CPE, the content file to obtain the encrypted content file;
storing, in the storage device for the CPE, the encrypted content file; and
sending, by the CPE to the second computing device, the content file.

7. The method of claim 6, wherein storing, in the storage device for the CPE, the association between the encrypted content file and the second computing device of the one or more computing devices comprises storing, in the storage device for the CPE and in response to determining that that the encrypted content file for the content file is not stored by the storage device for the CPE, the association between the encrypted content file and the second computing device of the one or more computing devices.

8. A customer-premises equipment (CPE) comprising:
one or more processors operably coupled to a memory;
a Trusted Platform Module (TPM); and
a storage device;
wherein the one or more processors are configured to:
receive configuration data identifying one or more computing devices of a local area network for the CPE as members of a trusted zone;
store, in the storage device, an association between an encrypted content file and a second computing device of the one or more computing devices, wherein the second computing device is a member of the trusted zone and the encrypted content file is an encrypted form of a content file;
intercept a request for the content file, wherein the request is originated from a first computing device of the one or more computing devices of the local area network for the CPE and is destined for a destination device external to the local area network for the CPE, and wherein the first computing device is a member of the trusted zone;
determine that the encrypted content file is stored by the storage device for the CPE and that the CPE stores an association of the encrypted content file and the second computing device that is also a member of the trusted zone;
in response to the determination, decrypt, using at least one cryptographic key obtained from the TPM, the encrypted content file to obtain the content file; and
send, to the first computing device, the content file.

9. The CPE of claim 8, wherein the request comprises a first request and the content file comprises a first content file, and wherein the one or more processors are further configured to:
receive a second request for a second content file, wherein the second request is destined for the destination device; and
in response to a determination that an encrypted content file for the second content file is not stored by the storage device, forward the second request to the destination device.

10. The CPE of claim 8, wherein the one or more processors are further configured to:
authenticate, using the at least one cryptographic key obtained from the TPM, the computing device to access the encrypted content file.

11. The CPE of claim 8, wherein the one or more processors are further configured to decrypt the encrypted content file using the at least one cryptographic key obtained from the TPM and at least one software state obtained from a Platform Configuration Register of the TPM.

12. The CPE of claim 8, wherein the one or more processors are further configured to:
  delete the encrypted content file from the storage device after a predetermined time.

13. A non-transitory computer-readable medium comprising instructions for causing at least one programmable processor of a customer-premises equipment (CPE) to:
  receive configuration data identifying one or more computing devices of a local area network for the CPE as members of a trusted zone;
  store, in a storage device for the CPE, an association between an encrypted content file and a second computing device of the one or more computing devices, wherein the second computing device is a member of the trusted zone and the encrypted content file is an encrypted form of a content file;
  intercept a request for the content file, wherein the request originates from a first computing device of the one or more computing devices of the local area network for the CPE and is destined for a destination device external to the local area network for the CPE, and wherein the first computing device is a member of the trusted zone;
  determine that the encrypted content file is stored by the storage device for the CPE and that the CPE stores an association of the encrypted content file and the second computing device that is also a member of the trusted zone;
  in response to the determination, decrypt, using at least one cryptographic key obtained from a Trusted Platform Module (TPM) for the CPE, the encrypted content file to obtain the content file; and
  send, to the first computing device, the content file.

14. The non-transitory computer-readable medium of claim 13, wherein the computer-readable medium further comprises instructions for causing the at least one programmable processor to:
  authenticate, using the at least one cryptographic key obtained from the TPM, the computing device to access the encrypted content file.

15. The non-transitory computer-readable medium of claim 13, wherein the computer-readable medium further comprises instructions for causing the at least one programmable processor to:
  decrypt the encrypted content file using the at least one cryptographic key obtained from the TPM and at least one software state obtained from a Platform Configuration Register of the TPM.

* * * * *